(12) United States Patent
Temam et al.

(10) Patent No.: US 10,885,434 B2
(45) Date of Patent: ***Jan. 5, 2021

(54) ALTERNATIVE LOOP LIMITS FOR ACCESSING DATA IN MULTI-DIMENSIONAL TENSORS

(71) Applicant: Google LLC, Mountain View, CA (US)

(72) Inventors: Olivier Temam, Paris (FR); Harshit Khaitan, San Jose, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/297,091

(22) Filed: Mar. 8, 2019

(65) Prior Publication Data

US 2019/0205756 A1 Jul. 4, 2019

Related U.S. Application Data

(63) Continuation of application No. 15/627,022, filed on Jun. 19, 2017, now Pat. No. 10,248,908.

(51) Int. Cl.
*G06N 3/08* (2006.01)
*G06N 20/00* (2019.01)
(Continued)

(52) U.S. Cl.
CPC .............. *G06N 3/08* (2013.01); *G06F 8/452* (2013.01); *G06N 3/063* (2013.01); *G06N 20/00* (2019.01);
(Continued)

(58) Field of Classification Search
None
See application file for complete search history.

(56) References Cited

U.S. PATENT DOCUMENTS 5,375,238 A 12/1994 Ooi
5,752,037 A 5/1998 Gornish et al.
(Continued)

FOREIGN PATENT DOCUMENTS

TW 200944021 A 10/2009

OTHER PUBLICATIONS

Taiwan Office Action in Taiwan Application No. 107120722, dated Apr. 15, 2019, 91 pages (with English translation).
(Continued)

*Primary Examiner* — Kamran Afshar
*Assistant Examiner* — Benjamin J Buss
(74) *Attorney, Agent, or Firm* — Fish & Richardson P.C.

(57) ABSTRACT

Methods, systems, and apparatus for accessing a N-dimensional tensor are described. In some implementations, a method includes, for each of one or more first iterations of a first nested loop, performing iterations of a second nested loop that is nested within the first nested loop until a first loop bound for the second nested loop is reached. A number of iterations of the second nested loop for the one or more first iterations of the first nested loop is limited by the first loop bound in response to the second nested loop having a total number of iterations that exceeds a value of a hardware property of the computing system. After a penultimate iteration of the first nested loop has completed, one or more iterations of the second nested loop are performed for a final iteration of the first nested loop until an alternative loop bound is reached.

20 Claims, 3 Drawing Sheets

(51) Int. Cl.
*G06F 8/41* (2018.01)
*G06N 3/063* (2006.01)
*G06T 1/20* (2006.01)
*G06N 3/04* (2006.01)

(52) U.S. Cl.
CPC .............. *G06F 8/4441* (2013.01); *G06N 3/04* (2013.01); *G06T 1/20* (2013.01)

(56) References Cited

U.S. PATENT DOCUMENTS

| | | | |
|---|---|---|---|
| 5,958,048 | A | 9/1999 | Babaian |
| 6,374,403 | B1 | 4/2002 | Darte et al. |
| 6,438,747 | B1 | 8/2002 | Schreiber |
| 7,225,439 | B2 | 5/2007 | Garthwaite |
| 7,631,305 | B2 | 12/2009 | Rong et al. |
| 8,448,157 | B2 | 5/2013 | Mitran |
| 8,539,211 | B2 | 9/2013 | Hoogerbrugge |
| 8,806,183 | B1 | 8/2014 | Yearsley |
| 8,817,026 | B1 | 8/2014 | Zimmerman |
| 8,904,155 | B2 | 12/2014 | Dieffenderfer |
| 2001/0021972 | A1 | 9/2001 | Topham |
| 2004/0034754 | A1 | 2/2004 | Schreiber |
| 2004/0088529 | A1 | 5/2004 | Schreiber |
| 2004/0093550 | A1 | 5/2004 | Kadatch |
| 2004/0187102 | A1 | 9/2004 | Garthwaite |
| 2008/0141013 | A1 | 6/2008 | Klima et al. |
| 2008/0301697 | A1 | 12/2008 | Southgate |
| 2009/0055815 | A1 | 2/2009 | Chan |
| 2010/0122066 | A1 | 5/2010 | Fischer |
| 2010/0169612 | A1 | 7/2010 | Persson |
| 2010/0274972 | A1 | 10/2010 | Babayan |
| 2012/0023316 | A1 | 1/2012 | Flachs |
| 2014/0181171 | A1 | 6/2014 | Dourbal |
| 2017/0220345 | A1 | 8/2017 | Woo |
| 2017/0220352 | A1 | 8/2017 | Woo |
| 2018/0121196 | A1 | 5/2018 | Tenam et al. |

OTHER PUBLICATIONS

Ahlander, K. "Einstein summation for multidimensional arrays," Computers & Mathematics with Applications, 44(8-9), 1007-1017. (Year: 2002).

Aho et al. "Compilers—Principles, Techniques, Tools," Compiler—Principles Techniques Tools, Addison Wesley, Jan. 1, 2007, 6 pages.

Balasa, F. et al. "Transformation of nested loops with modulo indexing to affine recurrences,"Parallel Processing Letters, 4(03), 271-280. (Year: 1994).

Bibireata, A. et al. "Memory-Constrained Data Locality Optimization for Tensor Contractions"LCPC 2003, LNCS 2958, pp. 93-108, 2004. (Year: 2004).

Coates et al. "Deep Learning with COTS HPC Systems," Journal of Machine Learning Research, Jun. 21, 2013, 9 pages.

Hegazy, T. et al. "Parallel Computing Basics: With a Case Study on the CeGP Cluster," CeGP: Center for Energy & Geo Processing. Dated Sep. 17, 2014.

Heinecke, A. et al. "Multi-and many-core data mining with adaptive sparse grids," In Proceedings of the 8th ACM International Conference on Computing Frontiers (p. 29). ACM. D01:10.1145/2016604. 2016640, Dated May, 2011.

Honarnnand, N. "Parallel Computing Basics". Fall 2015 CSE 610 Parallel Computer Architectures. Stony Brook University. Year 2015.

Johnson, R.W. et al. (1991). Multilinear Algebra and Parallel Programming. The Journal of Supercomputing, 5, 189-217.

Lyakh. "An efficient tensor transpose algorithm for multicore CPU, Intel Xeon Phi, and Nvidia Tesla GPU," computer Physics Communication, vol. 189, Apr. 1, 2015, 8 pages.

Ma, W. et al. "Practical Loop Transformations for Tensor Contraction Expressions on Multi-level Memory Hierarchies". CC 2011, LNCS 6601, pp. 266-285, 2011. (Year: 2011).

Parallel Computing. Wikipedia article, as it appeared on Apr. 12, 2016, Accessed May 11, 2018 using the Wayback Machine at https://web.archive.org/web/20160412115144/https://en.wikipedia.org/wiki/Parallel computing (Year 2016).

PCT International Search Report and Written Opinion issued in International Application No. PCT/US2018/029796, dated Aug. 3, 2018, 18 pages.

Rauchwerger, L. et al. (Apr. 1995). Parallelizing while loops for multiprocessor systems. In Parallel Processing Symposium, 1995. Proceedings., 9th International (pp. 347-356). IEEE. DOI: 10.1109/IPPS.1995.395955.

Stock, K. et al. "Model-driven simd code generation for a multi-resolution tensor kernel," In Parallel & Distributed Processing Symposium (IPDPS), 2011 IEEE International (pp. 1058-1067). IEEE. Dated May, 2011.

Wolfe, M. (1986). Loops skewing: The wavefront method revisited. International Journal of Parallel Programming, 15(4), 279-293.

PCT International Preliminary Report on Patentability in International Application No. PCT/US2018/029796, dated Dec. 24, 2019, 12 pages.

TW Office Action in Taiwanese Application No. 108130504, dated Jan. 7, 2020, 6 pages.

ALTERNATIVE LOOP LIMITS FOR ACCESSING DATA IN MULTI-DIMENSIONAL TENSORS

CROSS-REFERENCE TO RELATED APPLICATIONS

This application is a continuation application of, and claims priority to, U.S. patent application Ser. No. 15/627,022, titled "ALTERNATIVE LOOP LIMITS FOR ACCESSING DATA IN MULTI-DIMENSIONAL TENSORS," filed on Jun. 19, 2017. The disclosure of the foregoing application is incorporated herein by reference in its entirety for all purposes.

BACKGROUND

This specification generally relates to performing machine learning computations using a special purpose computational unit that includes multiple computing units.

Neural networks are machine learning models that employ one or more layers of models to generate an output, e.g., a classification, for a received input. Some neural networks include one or more hidden layers in addition to an outer layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Kernels can be represented as a matrix structure of weight inputs. Each convolutional layer uses the kernels to process inputs to the layer. A set of inputs to the layer can also be represented as a matrix structure.

SUMMARY

According to one innovative aspect of the subject matter described in this specification, a method for accessing an N-dimensional tensor includes, for each of one or more first iterations of a first nested loop, performing iterations of a second nested loop that is nested within the first nested loop until a first loop bound for the second nested loop is reached. A number of iterations of the second nested loop for the one or more first iterations of the first nested loop can be limited by the first loop bound in response to the second nested loop having a total number of iterations that exceeds a value of a hardware property of the computing system. After a penultimate iteration of the first nested loop has completed, one or more iterations of the second nested loop can be performed for a final iteration of the first nested loop until an alternative loop bound is reached, wherein the alternative loop bound is less than the first loop bound.

These and other implementations can each optionally include one or more of the following features. Some aspects can include substituting the alternative bound for the first loop bound for the final iteration of the first nested loop in response to determining that the penultimate iteration of the first nested loop has completed.

In some aspects, the value of the hardware property includes a number of individual computing units of the computing system. Each individual computing unit can include a compute tile, a processor, or a math unit.

Performing iterations of a second nested loop that is nested within the first nested loop based until a first loop bound for the second nested loop is reached can include performing each iteration of the second nested loop in parallel using the computing units. Each computing unit can perform a respective iteration of the second nested loop.

In some aspects, the alternative loop bound is based on a remainder value resulting from dividing the total number of iterations of the second nested loop by the number of computing units. A set of nested loops including the first nested loop and the second nested loop can include one or more loops nested between the first nested loop and the second nested loop and the second nested loop can be nested within another loop. The second nested loop can nested directly within the first nested loop without any other loops nested between the first nested loop and the second nested loop.

The subject matter described in this specification can be implemented in particular embodiments so as to realize one or more of the following advantages. By performing machine learning computations in parallel using multiple computing units, e.g., multiple compute tiles, multiple processors, or multiple math units, the computational speed and efficiency is increased allowing for more complex machine learning computations to be performed in a shorter amount of time. An adjustable loop bound for a nested loop allows for parallel processing of iterations of the nested loop even when the number of iterations is not a multiple of the number of individual computing units or other hardware property. The loop bound for an inner loop can be set such that the number of iterations of the inner loop equals the number of individual computing units for all but a final iteration of an outer loop in which the inner loop is nested. This allows each iteration of the inner loop to be performed in parallel, e.g., at the same time, for each iteration of the outer loop. In addition, for all but the last iteration of the outer loop, each individual computing unit is utilized for each iteration of the outer loop, resulting in faster and more efficient computations. By substituting an alternative loop bound for the inner loop for the final iteration of the outer loop, the number of instructions needed to perform the iterations of the inner loop can be reduced, allowing for fewer memory devices and/or more available memory.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

The subject matter described in this specification relates to using alternative loop limits for processing iterations of nested loops in parallel, e.g., using a hardware computing system that includes multiple computing units. Each computing unit may be implemented as a compute tile, a processor, or a math unit. The multiple computing units can be configured to accelerate inference workloads of a neural network and/or to accelerate computations for determining memory addresses for tensor elements. Each computing unit of the hardware computing system is self-contained and can independently execute computations required by a given layer of a multi-layer neural network.

A neural network having multiple layers can be used to compute inferences. For example, given an input, the neural network can compute an inference for the input. The neural network computes this inference by processing the input through each of the layers of the neural network. In particular, the layers of the neural network each have a respective set of weights. Each layer receives an input and processes the input in accordance with the set of weights for the layer to generate an output.

Therefore, in order to compute an inference from a received input, the neural network receives the input and processes it through each of the neural network layers in order to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

Techniques described in this specification can perform the computation of memory addresses for tensor elements by distributing tensor computations across multiple computing units, e.g., multiple compute tiles, multiple processors, or multiple math units. The computation of a memory address can include determining a memory address offset based on tensor status elements and adding the offset to a base address for the tensor elements.

A tensor is a multi-dimensional geometric object and example multi-dimensional geometric objects include matrices and data arrays. In general, a software algorithm is executed by one or more compute tiles to perform tensor computations by processing a nested loop to traverse an N-dimensional tensor. In one example computational process, each loop may be responsible for traversing a particular dimension of the N-dimensional tensor. For a given tensor construct, a compute tile may require access to an element of a particular tensor to execute one or more dot product computations associated with the tensor. A computation process performed within a neural network layer may include a multiplication of an input tensor including input activations with a parameter tensor including weights. The computation includes multiplying an input activation with a weight on one or more cycles and performing an accumulation of the products over many cycles. Computation occurs when an input activation provided by a memory structure is multiplied with a parameter or weight provided by another memory structure. Because the tensor is stored in a memory, a set of tensor indices may require translation to a set of memory addresses in order to retrieve the correct element of the tensor from the memory. In general, a tensor traversal unit of a compute tile executes control operations that provide the index of each dimension associated with the tensor and an order in which index elements are traversed to perform computations. Tensor computations end when multiplication results are written to an output bus and stored in memory.

Multiple math units within a compute tile (or multiple compute tiles) can perform the memory address computations for an N-dimensional tensor in parallel. For example, a computation may be performed for each iteration of an inner-most loop of the nested loops. Each loop in which a tensor computation is performed is referred to as a "tensor computation loop" and may not always be the inner-most loop. The computations for these iterations can be performed in parallel using the math units.

Traversing a tensor in a nested loop requires a computation of a memory address value of an element to load or store the corresponding data value of the element. For example, the elements of the three dimensional tensor may represent the features of an image being classified by a neural network. A first dimension (Z) may represent the width of the image, the second dimension (Y) may represent the height of the image, and the third dimension (X) may represent RGB values for pixels in the image. To classify the image, each RBG value may be multiplied by a filter value of a convolutional layer to generate an activation map.

A nested loop can be used to determining the memory address for accessing each RBG value of the tensor. The nested loop can include a loop for each dimension of the tensor. For example, an outer loop (z) may be used to traverse the Z dimension (the width of the image), a middle loop (y) may be used to traverse the Y dimension (the height of the image), and an inner loop (x) may be used to traverse the X dimension (the three RGB values for each pixel). At each iteration of the inner loop, a memory address is determined for one of the three RGB values for a particular pixel of the image represented by the value of the outer loop z and the middle loop y. For example, the memory address for the R value of the pixel of the image represented by Z=0 and Y=0, may be determined during the first iteration of the inner loop x when z=0 and y=0 (e.g., z=0; y=0; x=0). Similarly, the memory address for the G value of the pixel of the image represented by Z=5 and Y=2 may be determined during the third iteration of the inner loop x when z=5 and y=2 (e.g., z=5; y=2; x=2).

The memory address computations can be performed in parallel using multiple computing units. For example, if there are three computing units, the memory address value for each RGB value of a particular pixel can be determined in parallel. A first computing unit can determine the memory address for the R value for the pixel, a second computing unit can determine the memory address for the G value for the pixel, and a third computing unit can determine the memory address for the B value for the pixel. After a memory address is determined for a RGB value, a processing unit can access the value using the memory address and multiply the value with a filter value.

In some cases, the number of iterations of the tensor computation loop may exceed the number of computing units. In such cases, the iterations of the tensor computation loop can be divided into multiple parallel iterations of an outer loop in which the tensor computation loop is nested. For example, the dimension of an N-dimensional tensor that corresponds to the tensor computation loop may include 128 elements and the computing system may include 64 computing units. In this example, the tensor computation loop includes 128 iterations that can be divided into two outer loop iterations of 64 such that 64 computations are performed in parallel for each of two iterations of an outer loop. In this example, the first 64 iterations may be distributed amongst the computing units. After the first 64 iterations are complete, the next 64 iterations can be distributed amongst the computing units.

In some cases, the number of iterations of a tensor computation loop may not be an exact multiple of the number of computing units. For example, the dimension that corresponds to the tensor computation loop may include 160 elements and the computing system may have 64 computing units. In this example, the tensor computation loop includes 160 iterations that can be divided into two outer loop iterations of 64 and a third outer loop iteration of 32. To adjust the number of iterations of the tensor computation loop for the third outer loop iteration, the loop bound for the tensor computation loop may be changed from 64 to 32 after the second iteration of the outer loop, e.g., before the final iteration of the outer loop.

Figure 1:
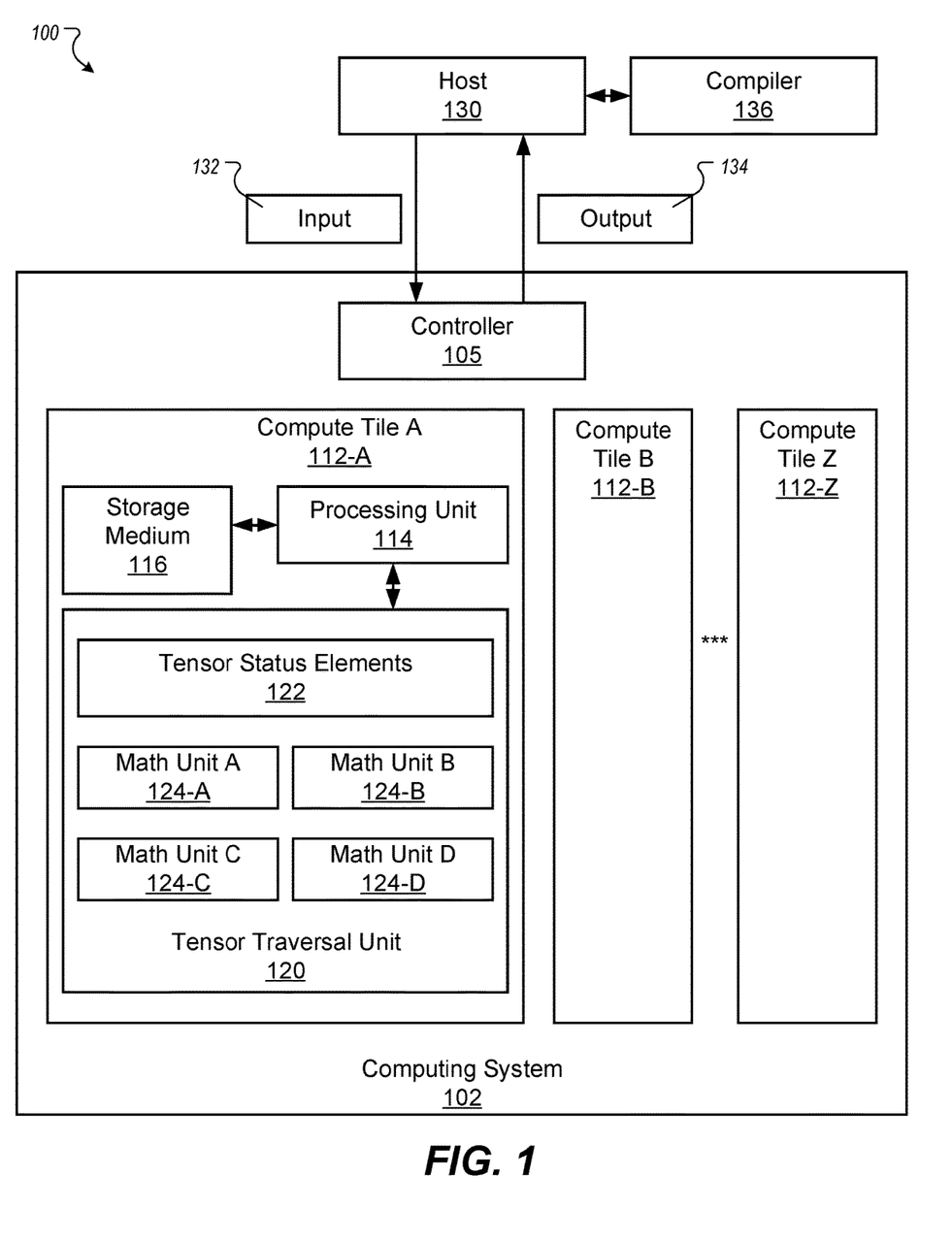
FIG. 1 is a block diagram of an environment in which an example computing system accelerates tensor computations.

FIG. 1 is a block diagram of an environment 100 in which an example computing system 102 accelerates tensor computations. For example, the computing system 102 may accelerate computations associated with deep neural networks (DNNs). The computing system 102 includes a controller 105 and multiple individual compute tiles 112A-112-Z. The controller 105 is configured to execute one or more instructions relating to tensor computations within the computing system 102. Although not shown, the controller 105 can include data memory for storing and accessing a variety of data relating to computations that occur within the computing system 102 and instruction memory for storing one or more machine readable instructions that are executable by one or more processors of the controller 105.

The controller 105 can receive input 132, e.g., instructions, compiled programs, etc., from a host 130. After the computing system 102 performs tensor computations, the controller 105 can provide output 134 to the host. For example, the output 134 may be memory addresses for tensor elements. The controller 105 can receive the input 132 from and provide the output 134 to the host 130 via a host interface (not shown).

The controller 105 can communicate with the compute tiles 112-A-112-Z via one or more data communication paths, e.g., one or more buses. Similarly, the compute tiles 112-A-112-Z can communicate with each other via one or more buses. An example computing system having multiple compute tiles is described in U.S. patent application Ser. No. 15/335,769 titled "Neural Network Compute Tile" and filed on Oct. 27, 2016, which is hereby incorporated by reference in its entirety.

Each compute tile 112-A-112-Z includes a processing unit 114, a data storage medium 116, and a tensor traversal unit 120. The storage medium 116 stores information within the computing system 110. In some implementations, the storage medium 116 is a volatile memory unit or units. In some other implementations, the storage medium 116 is a non-volatile memory unit or units. The storage medium 116 may also be another form of computer-readable medium, such as a floppy disk device, a hard disk device, an optical disk device, or a tape device, a flash memory or other similar solid state memory device, or an array of devices, including devices in a storage area network or other configurations. The instructions, when executed by the processing unit 102, cause the processing unit 102 to perform one or more tasks.

The processing unit 114 can include one or more processors and/or one or more finite-state machines (FSM). The processing unit 114 can execute instructions received from the controller 105. For example, the processing unit 114 can execute instructions for computing memory addresses (or memory address offsets) for tensor elements using the tensor traversal unit 120. For processing units that include a FSM, the FSM can query memory addresses for tensor elements from the tensor traversal unit 120.

In general, the tensor traversal unit 120 determines a status associated with one or more tensors. In some implementations, the status may include loop bound values, current loop index variable values, partial address offset values for determining a memory address value, and/or program counter values for handling branch loop bounds. The tensor traversal unit 120 may be implemented as an application-specific integrated circuit.

The tensor traversal unit 120 translates tensor indices into memory addresses. For example, the tensor traversal unit 120 may translate a set of N-dimensional tensor indices into a one-dimensional address space. The tensor traversal unit 120 can perform such translations by making a tensor element's memory address a combination (e.g., a linear combination) of the element's dimension indices.

The tensor traversal unit 120 can include one or more tensor status elements 122 and one or more math units 124. For example, the tensor traversal unit 120 of the compute tile 112-A includes four math units 124-A-124-D. Other tensor traversal units of other compute tiles may include other numbers of math units. Each of the tensor status elements 122 may be a storage element, for example, a register or any suitable storage circuitry. Each math unit 124 can include one or more arithmetic logic units (ALUs) and/or one or more hardware adders. The math unit 124 can be used to compute a memory address or memory address offset value for tensor elements, e.g., based on values stored in the tensor status elements. Example techniques for determining memory addresses using a tensor traversal unit are described in U.S. patent application Ser. No. 15/335,769 titled "Neural Network Compute Tile" and filed on Oct. 27, 2016 and U.S. patent application Ser. No. 15/014,265 titled "Accessing Data in Multi-Dimensional Tensors" and filed on Feb. 3, 2016.

The controller 105 can coordinate tensor computations using the compute tiles 112-A-112-Z. For example, the controller 105 can receive instructions to determine memory addresses for tensor elements. The controller 105 can perform the tensor computations using nested loops.

Each loop can be responsible for traversing a respective dimension of the N-dimensional tensor. A multi-dimensional tensor may be a matrix or a multi-dimensional matrix. For example, a 2-dimensional tensor is a matrix, while a 3-dimensional tensor is a three-dimensional matrix made up of multiple two-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of a thousand elements, and the third dimension may have a length of twenty elements. Of course, other numbers of elements in each dimension are possible.

Traversing the tensor in a nested loop can include a computation of a memory address value of an element to load or store the corresponding data value of the element. A for-loop is an example of a nested loop, where three loops tracked by three loop index variables (e.g., i, j, and k) can be nested to traverse through a three-dimensional tensor. In a neural network, a value of an element may be used in one or more dot product computations associated with the tensor.

For example, the value of the element may be multiplied with a corresponding parameter or weight. The elements of the tensor may be traversed in order using nested for-loops to access the element and perform one or more computations using the value of the element. Continuing the three dimensional tensor example, an outer for-loop may be used to traverse the loop tracked by variable i, a middle for-loop loop may be used to traverse the loop tracked by variable j, and an inner for-loop may be used to traverse the loop tracked by variable k. In this example, the first element accessed may be (i=0, j=0, k=0), the second element may be (i=0, j=0, k=1), and so on. The tensor traversal units 120 of the compute tiles 112-A-112-Z can be used to determine the memory address for the elements in order using nested loops so that a processing unit can access the value of the element and perform the one or more computations using the value of the element. The values of weights or parameters can also be accessed similarly using nested for-loops. The tensor traversal unit 120 can also be used to determine the addresses for weights or parameters used in the computations and/or for the outputs of the computations, which may be used as inputs to a hidden layer of the neural network.

The controller 105 may coordinate the tensor computations by iterating nested loops of a program and performing a computation for each iteration of one or more of the loops, e.g., for each iteration of an inner-most (or other) loop of the nested loops. To accelerate the tensor computations, the controller 105 may use multiple computing units to perform at least some of the tensor computations in parallel. The computing units may be individual compute tiles or individual math units. For example, the controller 105 may request that the compute tile 112-A perform a first tensor computation and, at the same time, request that the compute tile 112-B perform a second tensor computation. In another example, the controller 105 may request that the compute tile 112-A perform tensor computations for a particular tensor. The tensor traversal unit 120 can then use the math units 124-A-124-D to perform tensor computations in parallel.

A loop is generally completed when an index variable for the loop equals (or exceeds) a bound for the loop. For example, a loop may be programmed as "for (i=0; i<3; i++) in which i is the index variable and the bound is 3. This example loop includes three iterations (i=0, i=1, and i=2). If the index variable equals 3, the loop is exited without computation. When performing parallel computations using multiple computing units (e.g., using multiple compute tiles 112 or multiple math units 124), the controller 105 may iterate the index variable each time a computation is assigned to a computing unit and compare the index variable to the bound before assigning another iteration of the loop to another computing unit.

In some implementations, the nested loops of a program executed by the controller 105 may have loop bounds that have been determined based on a property of the computing system 110. For example, the loop bounds for one or more of the loops may be determined based on the number of compute tiles 112-A-112-Z of the computing system 110 or the number of math units of a tensor traversal unit 120.

In some implementations, a compiler 136 compiles a program for performing tensor computations for a tensor. The compiler 136 can be configured to determine the loop bounds for one or more of the loops based on the number of elements included in one or more of the dimensions of the tensor and/or the number of computing units of the computing system 110. The loop bound for a loop is the number that, when the index value for the loop equals the loop bound, the loop is completed. In other words, the loop bound for a loop can equal the number of iterations of the loop.

The compiler 136 may be configured to create an outer loop for one or more tensor computation loops (a loop in which a tensor computation is performed) and determine one or more loop bounds for the outer loop. The created outer loop may be used to divide the iterations of the tensor computation loop into multiple iterations of the outer loop. For example, the computing system 110 may include 64 computing units (e.g., compute tiles or math units) and the tensor computation loop may include 128 iterations. In this example, the computing system 110 is capable of performing 64 tensor computations in parallel. To perform the 64 tensor computations in parallel, the 128 iterations of the tensor computation loop can be divided into two outer loop iterations that each includes 64 iterations of the tensor computation loop. For example, the first iteration of the outer loop may include iterations 1-64 of the tensor computation loop. The second iteration of the outer loop may include iterations 65-128 of the tensor computation loop. In this way, 64 tensor computations are performed in parallel for the first iteration of the outer loop using each of the 64 computing units of the computing system (e.g., one computation per tile) and 64 tensor computations are performed in parallel for the second iteration of the outer loop using the 64 computing units.

The compiler 136 can determine whether an outer loop should be created and, if so, create the outer loop in the compiled program. In some implementations, the compiler 136 only creates an outer loop (in addition to any outer loops in the program being compiled) when a tensor computation loop has more iterations than the number of computing units of the computing system 110 on which the program will be executed. If a tensor computation loop has more iterations than the number of computing units, the compiler 136 can create an outer loop to divide the iterations of the tensor computation loop into multiple outer loop iterations.

The compiler 136 can also determine a loop bound for the created outer loop based on the number of iterations of the loop in which the tensor computation is performed and/or the number of computing units of the computing system 110 on which the program will be executed. The number of iterations of the tensor computation loop may be equal to the number of elements in the dimension corresponding to the loop if the number of iterations is a multiple of the number of computing units. The compiler 136 can divide the number of iterations of the tensor computation loop by the number of computing units as the number of computing units represents the highest number of iterations that can be performed in parallel using the computing units. For example, if the number of iterations of the tensor computation loop is 128 and the number of computing units is 64, the loop bound for the created outer loop may be two (128/64). Thus, in this example, the first iteration of the outer loop will include 64 parallel iterations of the tensor computation loop and the second iteration of the outer loop will include 64 parallel iterations of the tensor computation loop. If the division results in a remainder, as discussed below, the loop bound for the outer loop may be incremented by one.

The compiler 136 can also determine one or more loop bounds for the tensor computation loop based on the number of iterations of the tensor computation loop and the number of computing units of the computing system 110 on which the program will be executed. If the number of iterations of the tensor computation loop is an exact multiple of the number of computing units, the loop bound for tensor computation loop can be equal to the number of computing units for each iteration of the outer loop created for the tensor computation loop. For example, if the tensor computation loop has 120 iterations and the computing system includes 60 computing units, the loop bound for the tensor computation loop may be 60 and the loop bound for the outer loop may be 2. In this example, the first iteration of the outer loop will include 60 iterations (e.g., parallel iterations) of the tensor computation loop and the second iteration of the outer loop may include 60 iterations of the tensor computation loop.

If the number of iterations of the tensor computation loop is not an exact multiple of the number of computing units, the compiler 136 may determine two or more loop bounds for the tensor computation loop. For example, the compiler 136 may divide the number of iterations of the tensor computation loop by the number of computing units. As the number of iterations is not an exact multiple, the result of this division will include a remainder value. For example, the number of iterations may be 160 and the number of computing units may be 50. In this example, the compiler 136 may divide the number of iterations (160) by the number of computing units (50) to get a quotient of 3 and a remainder of 10. The compiler 136 can set a first loop bound for the tensor computation loop equal to the number of computing units (e.g., 50) and an alternative loop bound for the tensor computation loop equal to the remainder (e.g., 10). During execution of the program, the alternative loop bound may be used for the tensor computation loop for the final iteration of the outer loop and the first loop bound may be used for each other iteration of the outer loop. Continuing the previous example, the outer loop would have a loop bound of 4 as 160/50=3 with a remainder of 10 and the loop bound for the outer loop is incremented by one based on the remainder. For the first three iterations of the outer loop, the loop bound for the tensor computation loop would be 50. Thus, for each of the first three iterations of the outer loop, 50 iterations of the tensor computation loop would be performed in parallel, resulting in 150 iterations being performed. For the last iteration of the outer loop, the loop bound for the tensor computation loop would be 10, resulting in all 160 iterations of the tensor computation loop being performed in four iterations of the outer loop.

The compiled program can include instructions that cause the processor of the controller 105 to change the loop bound for the tensor computation loop from the first loop bound to the alternative loop bound after the penultimate iteration of the outer loop has completed and before the final iteration of the outer loop is performed. In this way, the loop bound for the alternative loop bound is used as the loop bound for the tensor computation loop for the final iteration of the outer loop that was created to divide the iterations of the tensor computation loop into multiple outer loop iterations.

In some implementations, the compiler 136 can create the outer loop for a tensor computation loop as the immediate outer loop in which the tensor computation loop is nested, i.e., no other loops nested between the outer loop and the tensor computation loop. In some implementations, the compiler 136 can create the outer loop as the most-outer loop of the nested loops in which the tensor computation loop is nested, i.e., the outer loop is not nested within another loop. By creating the outer loop at the most-outer loop of the nested loops, memory addresses determined using the nest loops and the tensor traversal units 120 align the tensor elements more contiguously. For example, without adjusting the loop bound for the final iteration, memory addresses may be determined for iterations of the loop at which no data will be stored resulting in wasted memory space. The alternative limit for the last iteration of the loop allows the tensor traversal unit to determine memory addresses only for tensor elements without using additional instructions.

Figure 2:
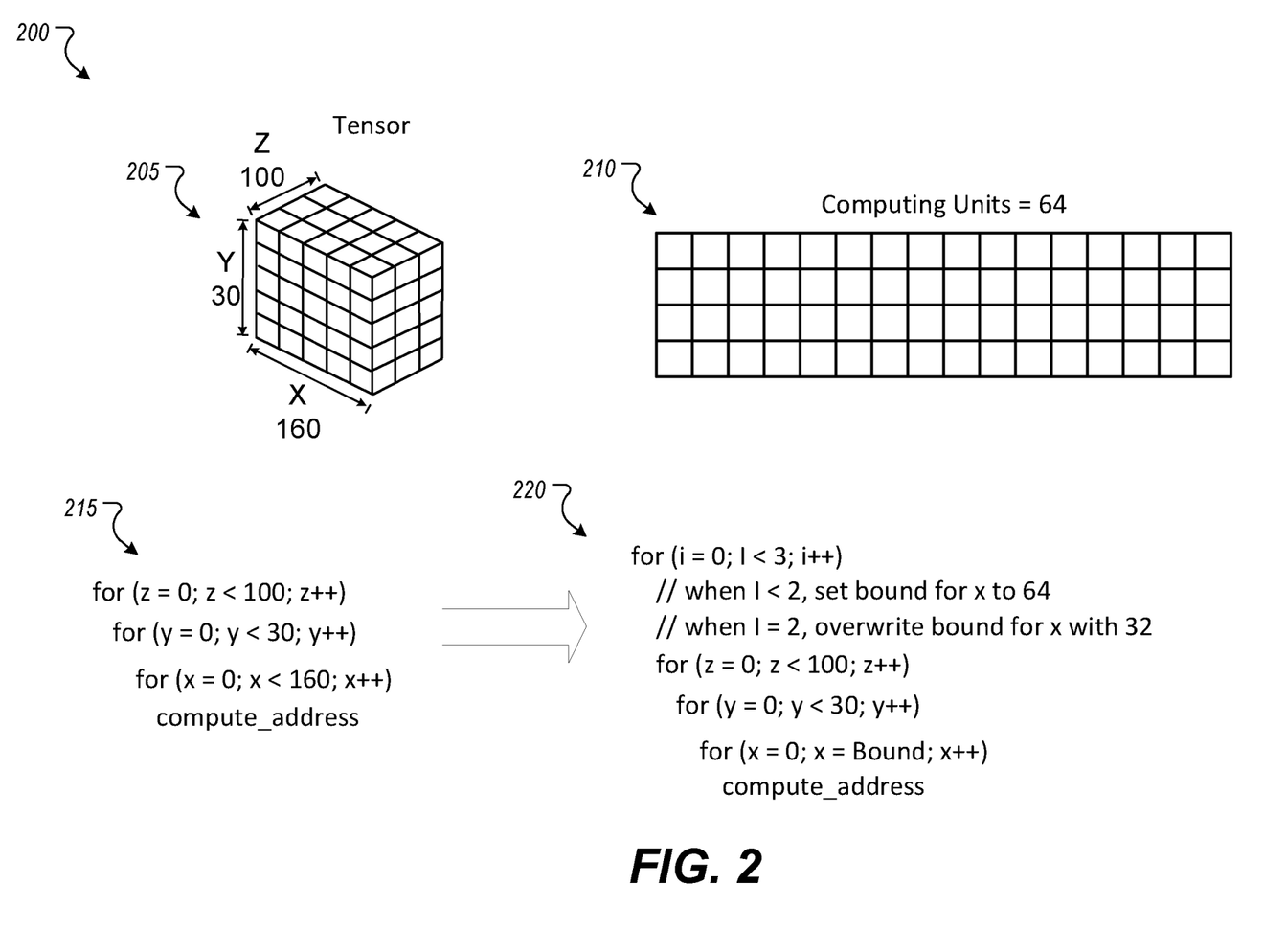
FIG. 2 illustrates example nested loops for traversing a tensor using multiple computing units.

FIG. 2 illustrates example nested loops 215 and 220 for traversing a tensor 205 using multiple computing units 210. Each individual computing unit 210 can be a compute tile or a math unit. In this example, the tensor 205 is a three dimensional tensor with an X dimension, a Y dimension, and a Z dimension. The X dimension has a length of 160 elements, the Y dimension has a length of 30 elements, and the Z dimension has a length of 100 elements, although the tensor 205 is not drawn to scale. Each element in the tensor 105 can store a respective data value that is used in a neural network computation.

In general, the tensor can be traversed using the nested loops 215. In this example, the X dimension is traversed using the inner loop, the Y dimension is traversed using the middle loop, and the Z dimension is traversed using the outer loop. For each iteration of the inner loop, a memory address is computed for the tensor element corresponding to the values of x, y, and z for the iteration of the inner loop.

The multiple computing units 210 can be a part of a computing system, e.g., each compute tile 210 can be the same as or similar to the compute tiles 112-A-112-Z of FIG. 1 or the math units 124 of FIG. 1. In this example, the computing system includes 64 computing units although other numbers of computing units are possible. The computing units 210 can perform tensor computations for the tensor 205 in parallel, e.g., using the nested loops 220.

A compiler, e.g., the compiler 136 of FIG. 1, can generate the nested loops 220 based on a program that includes the nested loops 215 (or code that represents the nested loops 215) and the number of computing units 210 of a computing system on which the program will be executed. For example, the compiler may determine that an outer loop should be created to divide iterations of the tensor computation loop (the loop for the X dimension in this example) into multiple outer loop iterations.

To determine whether an outer loop should be created, the compiler may compare the number of iterations of each tensor computation loop to a hardware property of the computing system. For example, the hardware property may be the number of computing units 210 or the total number of computations that the computing system can perform in parallel. If the number of iterations of the loop for the tensor computation loop exceeds the value of the hardware property, the compiler may create an outer loop. In this example, the number of iterations (160) of the loop for the X dimension exceeds the number of computing units (64). Thus, the compiler has created an outer loop with an index variable "i".

The compiler can also determine a loop bound for the outer loop based on the number of iterations of the tensor computation loop and the value of the hardware property (e.g., number of computing units). For example, the compiler may determine the bound by dividing the number of iterations (160) of the tensor computation loop by the number of computing units (64), resulting in 2 with a remainder of 32. As described above, the outer loop bound may be incremented by 1 for any remainder. Thus, the outer loop bound in this example is 3.

The compiler can also determine one or more loop bounds for the tensor computation loop based on the number of iterations of the tensor computation loop and the value of the hardware property. If the number of iterations of the tensor computation loop does not exceed the value of the hardware property, the loop bound for the tensor computation loop can be equal to the number of iterations. If the number of iterations of the tensor computation loop is an exact multiple of the hardware property, the loop bound for the tensor computation loop may be equal to the value of the hardware property. If the number of iterations of the tensor computation loop exceeds the value of the hardware property but is not an exact multiple of the value of the hardware property, the tensor computation loop may have a first loop bound for all but the final iteration of the loop and an alternative loop bound for the final iteration of the loop. The first loop bound may be equal to the value of the hardware property and the alternative loop bound may be equal to the remainder after dividing the number of iterations of the tensor computation loop by the value of the hardware property.

In this example, the number of iterations (160) of the tensor computation loop exceeds the number of computing units (64) but is not an exact multiple of the number of computing units. Thus, the first loop bound for the X dimension is 64 and the alternative bound is 32 (160/64=2 with a remainder of 32). For the first two iterations of the outer loop (loop i), the loop bound for the loop for the X dimension will be 64. For the final iteration of the outer loop, the loop bound for the X dimension will be 32.

For the first iteration of the outer loop, 64 memory addresses of the tensor may be determined in parallel using 64 computing units. For example, a first computing unit may determine the memory address for z=0; y=0; x=0; a second computing units may determine the memory address for z=0; y=0; x=0 . . . and a sixty-fourth computing unit may compute the memory address for z=0; y=0; x=63. For the last iteration of the outer loop, 32 of the 64 computing units may be used to determine the last 32 iterations of the inner loop.

Figure 3:
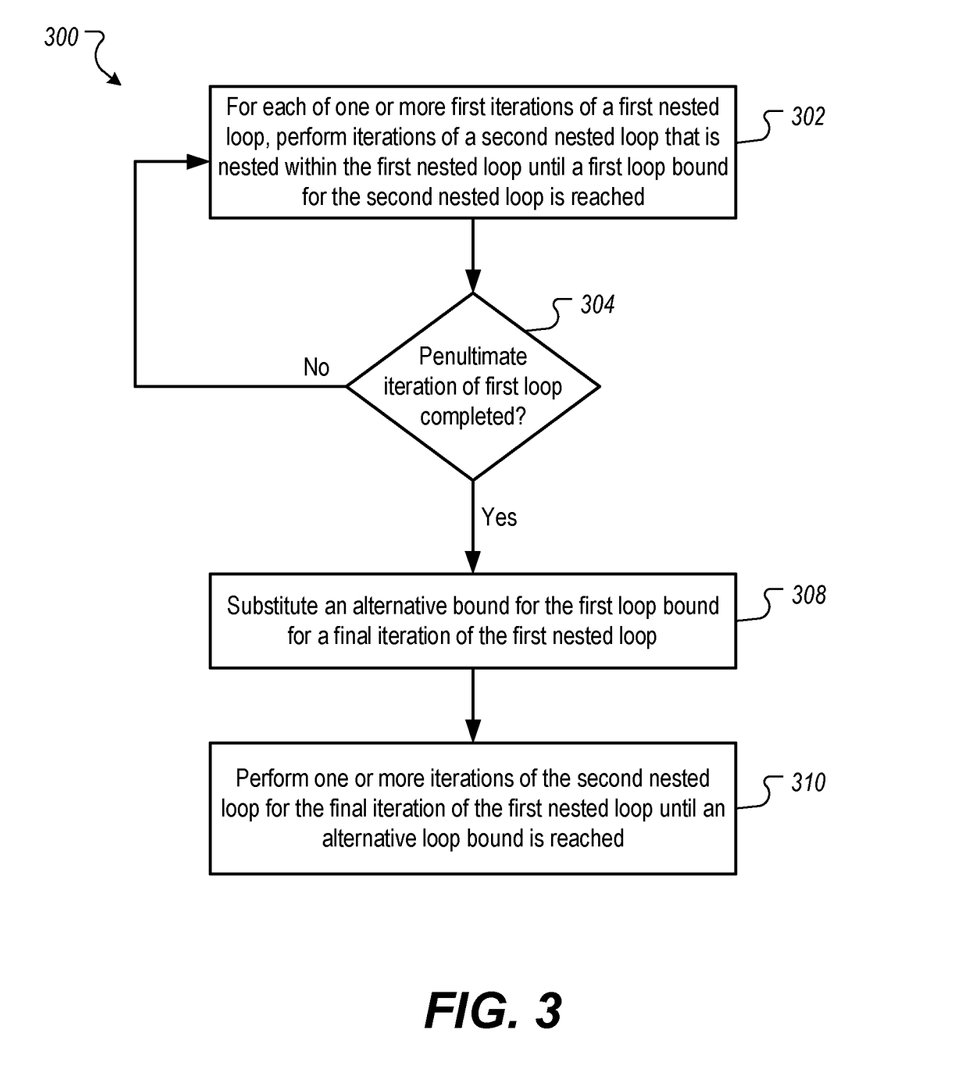
FIG. 3 is a flow diagram that illustrates an example process for performing tensor computations.

FIG. 3 is a flow diagram that illustrates an example process 300 for performing tensor computations. The process 300 may be performed by a system of one or more computers, e.g., the computing system 110 of FIG. 1.

For each of one or more first iterations of a first nested loop, the system performs iterations of a second nested loop that is nested within the first nested loop until a first loop bound for the second nested loop is reached (302). For example, the second nested loop may be a loop in which a tensor computation (e.g., dot product computation of memory address computation) is performed as part of a program.

The first loop may be an outer loop, e.g., created by a compiler that compiled a program that includes the first and second nest loops. For example, the compiler can identify a tensor computation loop, determine whether to create an outer loop for the tensor computation loop, and, if so, determine one or more loop bounds for the created outer loop and/or the tensor computation loop.

The compiler can determine the first loop bound for the second nested loop based on the total number of iterations of the second nested loop (e.g., the total number of elements in a dimension of a tensor corresponding to the second loop) and a number of computing units of the system. For example, if the total number of iterations of the second loop is less than the number of computing units, the first loop bound may be equal to the total number of iterations of the second nested loop. If the total number of iterations of the second nested loop is an exact multiple of the number of computing units, the first loop bound may be equal to the number of iterations. If the total number of iterations of the second nested loop is greater than the number of computing units, but not an exact multiple of the computing units, the compiler may set the first loop bound to the number of computing units and determine an alternative loop bound that is equal to the remainder of the total number of iterations of the second nested loop divided by the number of computing units.

In this example, assume that the total number of iterations of the second nested loop is greater than the number of computing units and that the total number of iterations of the second nested loop is not an exact multiple of the number of computing units. Thus, in this example, the number of iterations of the second nested loop for the one or more first iterations of the first nested loop is limited by the first loop bound in response to the second nested loop having a total number of iterations that exceeds a value of a hardware property of the computing unit.

The system may perform the iterations of the second nested loop in parallel. For example, as described above, the first loop bound for the second nested loop may be determined such that the number of iterations of the second nested loop does not exceed the number of computing units. In this example, each iteration of the second loop for each of the one or more first iterations of the first nested loop can be performed in parallel. As the system assigns an iteration of the second nested loop to a computing unit, the system can iterate an index variable for the second loop. When the index variable equals the first loop bound, the second loop has completed.

The system determines whether the penultimate (i.e., next to last) iteration of the first loop has completed (304). For example, the system may compare an index variable for the first loop to a loop bound for the first loop. If a difference between the loop bound and index variable is a specified number (e.g., 1), the system may determine that the penultimate iteration of the first loop has not completed. For example, a loop with an index variable of "i" may include three iterations. In this example, the loop may be programmed as "for (i=0; i<3)" or "for (i=1; i<4).

In the first example, the loop bound is 3, the final iteration of the loop is performed for i=2, and the penultimate iteration of the loop is performed for i=1. In general, the index variable is typically incremented when or just after an iteration of a loop is performed. In this example, if the index variable is 2 after an iteration of the loop was performed, the performed iteration was the penultimate iteration. Thus, if the difference between the bound (3) and the index variable is equal to 1, then the penultimate iteration of the loop was the iteration that completed.

Similarly, in the second example, the loop bound is 4, the final iteration of the loop is performed for i=3, and the penultimate iteration of the loop is performed for i=2. In this example, if the index variable is 3 after an iteration of the loop was performed, the performed iteration was the penultimate iteration. Thus, if the difference between the bound (3) and the index variable is equal to 1, then the penultimate iteration of the loop was the iteration that completed. If the penultimate iteration of the first loop has not completed, the system returns to operation 302 to perform the iterations of the second nested loop for the next iteration of the first nested loop corresponding to the updated index variable value.

If the penultimate iteration of the first loop has completed, the system substitutes, for the second loop, an alternative bound in place of the first loop bound (308). For example, the system may use the alternative bound for the second nested loop for the final iteration of the first nested loop.

The system performs one or more iterations of the second nested loop for the final iteration for the first nested loop until the alternative loop bound is reached (310). For example, if there are multiple iterations of the second nested loop remaining, the system may perform the iterations in parallel using multiple computing units.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for performing computations based on tensor elements of an N-dimensional tensor, comprising:
    determining that a number of tensor elements of a particular dimension of the N-dimensional tensor is not an exact multiple of a number of individual computing units of the computing system that will be used to perform computations based on the tensor elements of the N-dimensional tensor and in response:
        generating a first loop for controlling a number of iterations of a second loop used to traverse the particular dimension;
        determining a first loop bound for the second loop and an alternative loop bound for the second loop based on the number of tensor elements of the particular dimension and the number of individual computing units of the computing system, wherein the first loop bound controls a number of iterations of the second loop for one or more first iterations of the first loop and the alternative loop bound controls the number of iterations of the second loop for a final iteration of the first loop such that the number of iterations of the second loop does not exceed a number of tensor elements that will be used to perform the computations; and
        generating code that has the second loop nested within the first loop;
    executing the code to access the N-dimensional tensor, including:
        for each of one or more first iterations of the first loop, performing iterations of the second loop that is nested within the first loop until the first loop bound for the second loop is reached, wherein:

for each iteration of the second loop, a computing unit of a plurality of computing units performs a computation based on a tensor element of the N-dimensional tensor, each tensor element including a data value;

after a penultimate iteration of the first loop has completed, performing one or more iterations of the second loop for a final iteration of the first loop until the alternative loop bound is reached, wherein the alternative loop bound is less than the first loop bound; and outputting data indicating an output of each computation to a processing unit.

2. The method of claim 1, wherein the computations include machine learning computations.

3. The method of claim 1, wherein the computations include determining memory addresses for the tensor elements.

4. The method of claim 1, further comprising substituting the alternative loop bound for the first loop bound for the final iteration of the first loop in response to determining that the penultimate iteration of the first loop has completed.

5. The method of claim 1, wherein each individual computing unit comprises a hardware compute tile, a processor, or a hardware math unit.

6. The method of claim 1, wherein:
performing iterations of the second loop that is nested within the first loop until the first loop bound for the second loop is reached comprises performing each iteration of the second loop in parallel using the computing units; and
each computing unit performs a respective iteration of the second nested loop.

7. The method of claim 1, wherein the alternative loop bound is based on a remainder value resulting from dividing the number of tensor elements of the particular dimension by the number of individual computing units.

8. The method of claim 1, wherein a set of loops including the first loop and the second loop includes one or more loops nested between the first loop and the second loop and the second loop is nested within another loop.

9. The method of claim 1, wherein the second loop is nested directly within the first loop without any other loops nested between the first loop and the second loop.

10. A system for performing computations based on tensor elements of an N-dimensional tensor, comprising:
a plurality of individual computing units; and
one or more processors configured to:
determining that a number of tensor elements of a particular dimension of the N-dimensional tensor is not an exact multiple of a number of individual computing units of the computing system that will be used to perform computations based on the tensor elements of the N-dimensional tensor and in response:
generating a first loop for controlling a number of iterations of a second loop used to traverse the particular dimension;
determining a first loop bound for the second loop and an alternative loop bound for the second loop based on the number of tensor elements of the particular dimension and the number of individual computing units of the computing system, wherein the first loop bound controls a number of iterations of the second loop for one or more first iterations of the first loop and the alternative loop bound controls the number of iterations of the second loop for a final iteration of the first loop such that the number of iterations of the second loop does not exceed a number of tensor elements that will be used to perform the computations; and
generating code that has the second loop nested within the first loop;
executing the code to access the N-dimensional tensor, including:
for each of one or more first iterations of the first loop, performing iterations of the second loop that is nested within the first loop until the first loop bound for the second loop is reached, wherein:
for each iteration of the second loop, a computing unit of a plurality of computing units performs a computation based on a tensor element of the N-dimensional tensor, each tensor element including a data value;
after a penultimate iteration of the first loop has completed, performing one or more iterations of the second loop for a final iteration of the first loop until the alternative loop bound is reached, wherein the alternative loop bound is less than the first loop bound; and
outputting data indicating an output of each computation to a processing unit.

11. The system of claim 10, wherein the computations include machine learning computations.

12. The system of claim 10, wherein the computations include determining memory addresses for the tensor elements.

13. The system of claim 10, wherein the operations comprise substituting the alternative loop bound for the first loop bound for the final iteration of the first loop in response to determining that the penultimate iteration of the first loop has completed.

14. The system of claim 10, wherein each individual computing unit comprises a hardware compute tile, a processor, or a hardware math unit.

15. The system of claim 10, wherein:
performing iterations of the second loop that is nested within the first loop until the first loop bound for the second loop is reached comprises performing each iteration of the second loop in parallel using the computing units; and
each computing unit performs a respective iteration of the second nested loop.

16. The system of claim 10, wherein the alternative loop bound is based on a remainder value resulting from dividing the number of tensor elements of the particular dimension by the number of individual computing units.

17. The system of claim 10, wherein a set of loops including the first loop and the second loop includes one or more loops nested between the first loop and the second loop and the second loop is nested within another loop.

18. The system of claim 10, wherein the second loop is nested directly within the first loop without any other loops nested between the first loop and the second loop.

19. A non-transitory computer storage medium encoded with a computer program, the program comprising instructions that when executed by one or more data processing apparatus cause the one or more data processing apparatus to perform operations comprising:
determining that a number of tensor elements of a particular dimension of the N-dimensional tensor is not an exact multiple of a number of individual computing units of the computing system that will be used to perform computations based on the tensor elements of the N-dimensional tensor and in response:

generating a first loop for controlling a number of iterations of a second loop used to traverse the particular dimension;

determining a first loop bound for the second loop and an alternative loop bound for the second loop based on the number of tensor elements of the particular dimension and the number of individual computing units of the computing system, wherein the first loop bound controls a number of iterations of the second loop for one or more first iterations of the first loop and the alternative loop bound controls the number of iterations of the second loop for a final iteration of the first loop such that the number of iterations of the second loop does not exceed a number of tensor elements that will be used to perform the computations; and generating code that has the second loop nested within the first loop;

executing the code to access the N-dimensional tensor, including:

for each of one or more first iterations of the first loop, performing iterations of the second loop that is nested within the first loop until the first loop bound for the second loop is reached, wherein:

for each iteration of the second loop, a computing unit of a plurality of computing units performs a computation based on a tensor element of the N-dimensional tensor, each tensor element including a data value;

after a penultimate iteration of the first loop has completed, performing one or more iterations of the second loop for a final iteration of the first loop until the alternative loop bound is reached, wherein the alternative loop bound is less than the first loop bound; and outputting data indicating an output of each computation to a processing unit.

20. The non-transitory computer storage medium of claim 19, wherein the computations include at least one of (i) machine learning computations or (ii) determining memory addresses for the tensor elements.

* * * * *